United States Patent
Osaka et al.

(10) Patent No.: US 6,396,662 B1
(45) Date of Patent: May 28, 2002

(54) HIGH/LOW DENSITY MAGNETIC HEAD SLIDER WITH LATERAL INCISION

(75) Inventors: Tomohiko Osaka; Norikazu Kudo, both of Yamagata (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 09/521,362

(22) Filed: Mar. 8, 2000

(30) Foreign Application Priority Data

Mar. 9, 1999 (JP) ............................................. 11-061680

(51) Int. Cl.[7] .......................... G11B 5/60; G11B 17/32; G11B 21/21
(52) U.S. Cl. ............................... 360/234.2; 360/236.8; 360/236.5; 360/237; 360/236.9
(58) Field of Search ......................... 360/234.2, 236.5, 360/236.8, 236.1, 237, 237.1, 236.9, 236.4

(56) References Cited

U.S. PATENT DOCUMENTS 6,222,703 B1 * 4/2001 Osaka et al. ............. 360/236.8
6,243,232 B1 * 6/2001 Osaka et al. ............. 360/234.2

* cited by examiner

Primary Examiner—Craig A. Renner
(74) Attorney, Agent, or Firm—Ladas & Parry

(57) ABSTRACT

A magnetic head has a first magnetic head unit for recording and reproducing information to and from a first flexible rotating recording medium; a second magnetic head unit for recording and reproducing information to and from a second flexible rotating recording medium having a coercive force lower than a coercive force of the first flexible rotating recording medium; and a slider supporting the first and second magnetic head units, the slider having a central groove separating a first air bearing surface at which the first magnetic head unit is provided and a second air bearing surface at which the second magnetic head unit is provided, the slider generating an elevating force from an air flow generated in a space between the first and second air bearing surfaces and the flexible rotating recording medium, the first air bearing surface having a width on a leading edge side thereof perpendicular to a direction of approach of the flexible rotating recording medium and a width on a trailing edge side thereof disposed opposite the leading edge side, the width of the leading edge side being greater than the width of the trailing edge side.

8 Claims, 8 Drawing Sheets

MAGNETIC
DISK

HIGH/LOW DENSITY MAGNETIC HEAD SLIDER WITH LATERAL INCISION

BACKGROUND OF THE INVENTION

1. Field of the Invention

The present invention relates generally to a magnetic head and magnetic head apparatus, and more particularly, to a magnetic head and magnetic head apparatus for recording and reproducing information to and from a flexible rotating recording medium in a state in which the magnetic head floats over the flexible rotating recording medium due to an air flow generated between the magnetic head and the flexible rotating recording medium.

2. Description of the Related Art

Generally, an ordinary magnetic disk drive that uses a flexible magnetic disk having a coercive force of 900 oersted (Oe) or less as a magnetic recording medium allows a relatively low rotational speed of for example 300 rpm to 720 rpm. In this case, magnetic recording and reproduction is performed by causing the magnetic head to be in direct sliding contact with the magnetic disk.

However, with recent advances in high-density recording on magnetic disks, the rotation speed of the magnetic disk has been increased to for example 3000 rpm, with the coercive force of the magnetic disk being increased to 1500 Oe or more. As a result, in order to accommodate such so-called high-capacity magnetic disks a magnetic disk drive has appeared in which the magnetic head is provided with a narrow gap. Hereinafter such a magnetic disk drive will be referred to as a high-capacity magnetic disk drive.

Since a high-capacity magnetic disk drive allows the magnetic disk to be rotated at high speeds, the magnetic disk and the magnetic head used therein may be easily damaged if the magnetic head were to be caused to be in direct contact with the magnetic disk, as is done in the conventional magnetic disk drive.

As a result, the high-capacity magnetic disk drive is designed so that the magnetic head floats in an elevated state over the surface of the high-capacity magnetic disk due to an elevating force arising as a result of an air flow caused by a relative speed between a slider surface of the magnetic head and the magnetic disk. Magnetic recording and reproduction is performed while a state of non-contact between the magnetic head and the magnetic disk is maintained.

FIGS. 1, 2, 3, 4 and 5 show a magnetic head used in the conventional high-capacity magnetic disk drive.

As shown in FIGS. 1 and 2, the conventional high-capacity magnetic head 1 generally comprises a slider 2 and a magnetic head unit 3. The slider 2 supports the magnetic head unit 3 and causes the magnetic head unit 3 to float over the magnetic disk 6, as shown for example in FIG. 3.

The top surface of the slider 2 forms an air bearing surface for forming an air bearing with respect to the magnetic disk 6. Additionally, a central groove 2a is formed at a central position of the top surface of the slider 2. As shown in FIG. 1, the central groove 2a divides the air bearing surface into a first air bearing surface 2b located to the right side of the central groove 2a and a second air bearing surface 5 located to the left side.

The magnetic head unit 3 and a pair of grooves or slots 4 are provided on the first air bearing surface 2b. The magnetic head unit 3 for performing magnetic recording and reproducing is formed by sandwiching a gap member between thin plates of magnetic cores.

The slots 4 extend in a tangential direction of the magnetic disk 6, that is, in the direction of arrow X in FIG. 1, and provide a vent for an air flow produced between the magnetic disk 6 and the first air bearing surface 2b. By providing a vent to the air flow produced between the magnetic disk 6 and the first air bearing surface 2b, an elevating force exerted on the magnetic head 1 is reduced. Accordingly, by providing the slots 4, the elevating force of the magnetic head 1 can be controlled.

As described above, the second air bearing surface 5 is formed to the left of the central groove 2a located on the top surface of the slider 2 as shown in FIG. 2. Like the first air bearing surface 2b, the second air bearing surface 5 also produces a force for elevating the magnetic head 1.

FIG. 3 is a lateral cross-sectional view of a conventional magnetic head as seen from a direction of disk approach thereto. As shown in the drawing, a pair of magnetic heads 1 are supported so as to be opposite each other within the magnetic disk drive. The elevating force generated by the second air bearing surface 5 described above exerts a force that pushes the magnetic disk 6 in the direction of the first air bearing surface 2b, that is, in the direction of the magnetic head unit 3, of the opposite magnetic head 1. Accordingly, the second air bearing surface 5 also functions as a pressure pad for pressing the magnetic disk 6 toward the opposite magnetic head 1.

Additionally, as described above, slots 4 are formed in the first air bearing surface 2b. The slots 4 provide a vent for the air flow produced between the magnetic disk 6 and the first air bearing surface 2b, thus reducing the elevating force exerted on the magnetic head 1. Accordingly, the magnetic disk 6 is deformed by a negative pressure generated in the slots 4 and a pressure generated at the second air bearing surface 5 due to a change in air flow so as to warp toward a gap 31 as the magnetic disk 6 rotates between the pair of magnetic heads 1. With this construction, optimum recording and reproduction of information to and from the magnetic disk 6 is ensured even with floating magnetic heads 1.

FIG. 6 is an oblique view of a second example of a conventional magnetic head, in which the magnetic head is provided with both a high-density R/W gap and a lowdensity R/W gap. The magnetic head 1a comprises a slider, a first magnetic head unit 3a and a second magnetic head unit 3b.

A central groove 2a is formed at a central position of the top surface of the slider 2. As shown in FIG. 6, the central groove 2a divides the top surface of the slider into two surfaces. A first air bearing surface 9a is located in the figure to the left side of the central groove 2a, with the high-density R/W gap being formed on the first air bearing surface 9a. A second air bearing surface 9b is formed parallel to the first air bearing surface 9a on a side of the central groove 2a opposite the side on which the first air bearing surface 9a is formed, with the low-density R/W gap being formed on the second air bearing surface 9b. A pair of grooves or slots 4 is formed so as to extend the length of the first air bearing surface 9a.

The magnetic head 1a having the structure described above can be adapted to a 300 rpm low-density mode or a 3600 rpm high-density mode, depending on the type of recording medium.

A description will now be given of how the magnetic head 1 faces the magnetic disk 6, with reference to FIG. 4 and FIG. 5 FIGS. 4 and 5 show views of a state in which the magnetic head 1 is recording information to or reproducing information from a magnetic disk 6, from a radial direction Y of the magnetic disk 6.

FIG. 4 shows the magnetic disk 6 in a state of optimal approach to the magnetic head 1.

As shown in FIG. 4, a pair of slots 4 are formed in the first air bearing surface 2b in which the first magnetic head unit 3 is provided. These slots 4 are formed along the entire length of the first air bearing surface, that is, from a leading edge 7 of the magnetic head 1, that is, an edge side of the magnetic head 1 at which the magnetic disk 6 enters the magnetic head 1, to a trailing edge 8 of the magnetic head 1, that is, an edge side of the magnetic head 1 at which the magnetic disk 6 exits the magnetic head 1. As a result, a reduction in the elevating force due to the presence of the slots 4 is generated over the entire extent of the length of the first air bearing surface 2b.

Accordingly, even in a state of optimal approach a distance H between the magnetic disk 6 and the leading edge 7 of the magnetic head 1 in the above-described construction in which the slots 4 are provided is smaller than a corresponding distance in a construction in which the slots 4 are not provided.

Moreover, with such a construction the magnetic disk 6 is maintained in close proximity to the magnetic head unit 3 as a result of the reduction in elevating force by the slots 4, thus providing optimal magnetic recording and reproduction.

By contrast, FIG. 5 shows a state in which the magnetic disk 6 approaches the magnetic head 1 at a height position lower than that of an optimal approach. Such a small-clearance state of approach results from the flexibility of the magnetic disk 6 or from inevitable errors in the production process thereof. This phenomenon is called penetration.

When the height of the magnetic disk 6 upon approach to the magnetic head 1 is lower than a standard optimum height position as described above, the distance H is reduced to such an extent that the magnetic disk 6 may come into contact with the leading edge 7 of the magnetic head 1, and the magnetic disk 6 or the leading edge 7 of the magnetic head 1 may be damaged as a result.

Additionally, if a structure is used in which no slots 4 are provided in an effort to prevent damage to the magnetic disk 6 due to this penetration, the magnetic disk 6 and the magnetic head unit 3 become separated and it becomes impossible to obtain optimal magnetic recording and reproduction.

SUMMARY OF THE INVENTION

Accordingly, it is a general object of the present invention to provide an improved and useful magnetic head in which the disadvantages described above are eliminated.

The above-described object of the present invention is achieved by a magnetic head comprising:

a first magnetic head unit for recording and reproducing information to and from a first flexible rotating recording medium;

a second magnetic head unit for recording and reproducing information to and from a second flexible rotating recording medium having a coercive force lower than a coercive force of the first flexible rotating recording medium; and a slider supporting the first and second magnetic head units, the slider having a central groove separating a first air bearing surface at which the first magnetic head unit is provided and a second air bearing surface at which the second magnetic head unit is provided, the slider generating an elevating force from an air flow generated in a space between the first and second air bearing surfaces and the flexible rotating recording media, the first air bearing surface having a width on a leading edge side thereof perpendicular to a direction of approach of the flexible rotating recording medium and a width on a trailing edge side thereof disposed opposite the leading edge side, the width of the leading edge side being greater than the width of the trailing edge side.

Additionally, the above-described object of the present invention is also achieved by magnetic head as claimed in claim 1, wherein the width of the first air bearing surface in a direction perpendicular to a direction of approach and retreat of the flexible rotating recording medium gradually declines from the leading edge toward the trailing edge.

According to the invention described above, a sufficient elevating force due to the generation of air flow between the slider and the recording medium can be maintained at the leading edge and a hard collision between the recording medium and the slider at the leading edge can thus be prevented. In addition, because the elevating force gradually decreases toward the trailing edge the recording medium can be brought into close proximity to the magnetic head for optimal magnetic recording and reproduction.

Additionally, the above-described object of the present invention is also achieved by the magnetic head as described above, wherein:

a periphery of a flat surface forming the first air bearing surface is chamfered; and the leading edge of the first air bearing surface has a width equal to a distance to a first interference wave appearing at both lateral edges of the first air bearing surface as measured using an optical flat placed on the first air bearing surface.

According to the invention described above, the dimensions of the flat surface forming the first air bearing surface remain unchanged even if the shape of the chamfered edge changes, so a constant elevating force can be maintained.

Additionally, the above-described object of the present invention is also achieved by the magnetic head as described above, wherein:

the first air bearing surface is divided into a first surface part and a second surface part by a lateral incision extending in a direction perpendicular to the direction of approach of the flexible rotating recording medium; and a width of the second air bearing surface in a direction perpendicular to the direction of approach of the flexible rotating recording medium is either constant or gradually declines from a leading edge side of the second air bearing surface toward a trailing edge side of the second air bearing surface.

According to the invention described above, the elevating force at the first air bearing surface can be adjusted and the distance between the first magnetic head and the disk for optimal magnetic recording and reproduction. In addition, the elevating force at the leading edge of the second air bearing surface can be maintained at an appropriate level, so a hard collision between the disk and the slider can be prevented and damage to the disk avoided.

Additionally, the above-described object of the present invention is also achieved by the magnetic head as described above, wherein the lateral incision has a depth greater than a depth of the central groove.

According to the invention described above, the weight of the magnetic head is reduced, thereby improving tracking.

Additionally, the above-described object of the present invention is also achieved by the magnetic head as described above, wherein a pivot is provided between the first and second magnetic head units at a point of flotation of the magnetic head units.

Additionally, the above-described object of the present invention is also achieved by the magnetic head as described above, wherein a distance N between the pivot and a hypothetical line extending from a leading edge side of the second surface part of the first air bearing surface in a direction perpendicular to the direction of approach of the flexible rotating recording medium is not more than 2 mm.

According to the invention described above, wherein the point of flotation is the point at which a combined elevating force acts on the magnetic head, the elevating force is adjusted appropriately and collision between the recording medium and the slider can be avoided. In addition, a constant elevating force can be maintained and the magnetic head can be elevated effectively for optimal magnetic recording and reproduction.

Additionally, the above-described object of the present invention is also achieved by the magnetic head as described above, wherein the leading edges and the trailing edges of the first and second air bearing surfaces are curved so as to be slanted with respect to the flexible rotating recording medium.

Additionally, the above-described object of the present invention is also achieved by the magnetic head as described above, wherein the angle of slant of the leading edges and the trailing edges of the first and second air bearing surfaces with respect to the direction of approach of the flexible rotating recording medium is not less than 2° and not more than 45°.

Additionally, the above-described object of the present invention is also achieved by the magnetic head as described above, wherein a width of the curved portions of the leading edges and trailing edges of the first and second air bearing surfaces in a direction perpendicular to the direction of approach of the flexible rotating recording medium is not less than 0.05 mm and not more than 0.5 mm.

According to the invention described above, by curving the edges of the air bearing surfaces so as to be slanted with respect to the disk within an angle of slant that does not affect the elevating force, contact between the disk and the magnetic head can be prevented or, in the event of such contact, damage to the disk can be reduced.

Additionally, the above-described objects of the present invention are also achieved by the magnetic head as described above, wherein:

a first interference line appearing by placing an optical flat on at least one of either the first air bearing surface or the second air bearing surface and measuring the interference lines is rounded with a radius R of not less than 0.2 mm and not more than 1.0 mm at corner portions on the leading edge side of at least one of the periphery of the flat surface forming the first air bearing surface and the periphery of the flat surface forming the second air bearing surface; and the first interference line is rounded with a radius of not less then 0.2 mm and not more than 1.0 mm at corners of edges of the first surface part and corners of edges of the second surface part disposed opposite each other across the lateral incision.

According to the invention described above, any contact between the magnetic head and the disk is a line and not a point, and so a force of contact between the magnetic head and the disk can be dispersed and damage to the disk can be avoided.

Additionally, the above-described objects of the present invention are also achieved by a magnetic head apparatus adapting the magnetic head as described above, wherein:

the magnetic head units are disposed opposite each other;

a read/write gap provided on the second magnetic head unit is positioned closer to the leading edge of the magnetic head than a read/write gap provided on the first magnetic head unit; and an eraser gap provided on the second magnetic head unit is positioned closer to the leading edge side of the magnetic head than a core of the first magnetic head unit.

According to the invention described above, the distribution of weight of the magnetic head is well balanced center and optimal magnetic recording and reproduction can be obtained from the second magnetic head unit in particular.

Other objects, features and advantages of the present invention will become more apparent from the following detailed description when read in conjunction with the accompanying drawings.

DESCRIPTION OF THE PREFERRED EMBODIMENTS

A description will now be given of one preferred embodiment of a magnetic head according to the present invention, with reference to the accompanying drawings, in the first instance to FIG. 7 and FIG. 8.

Figure 1:
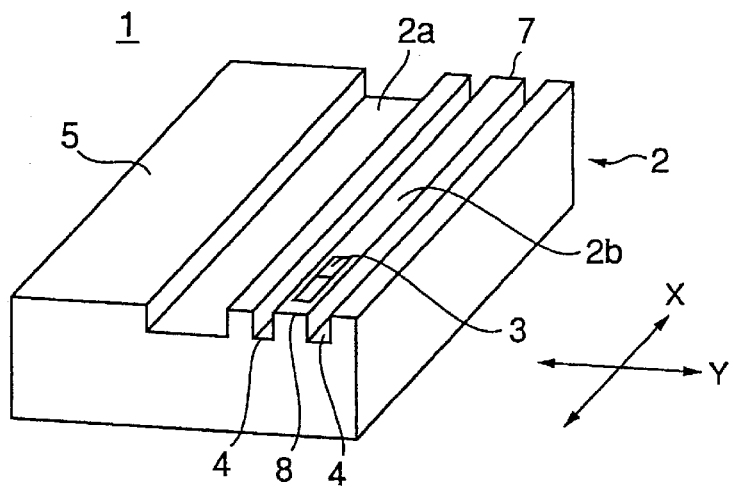
FIG. 1 is an oblique view of a conventional magnetic head for the purpose of explaining an operation thereof.
Figure 2:
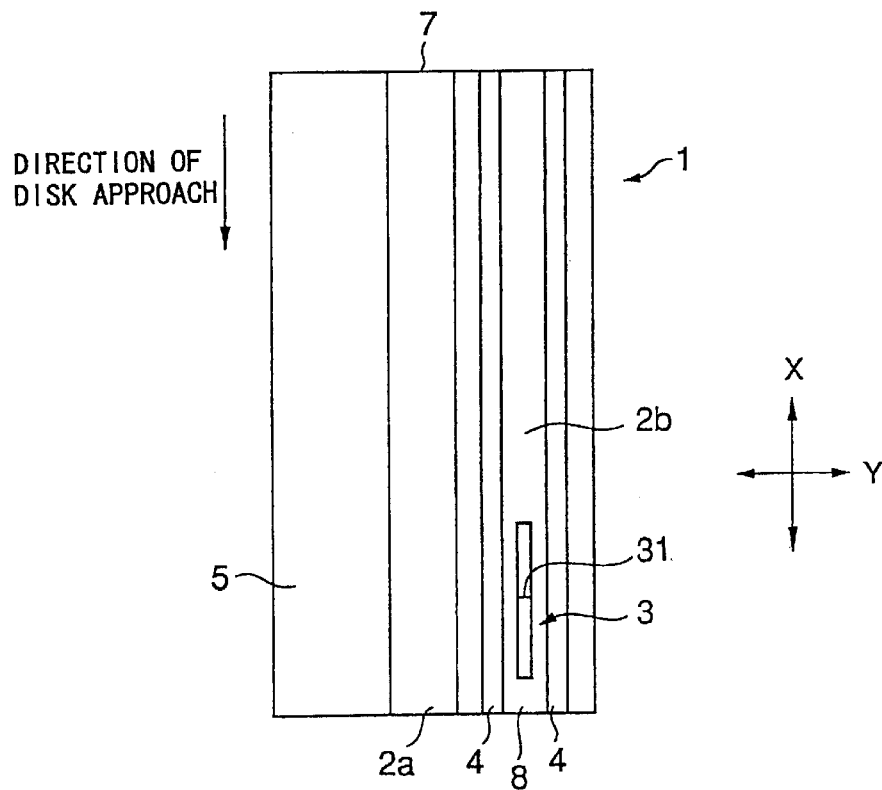
FIG. 2 is a plan view of the conventional magnetic head shown in FIG. 1.
Figure 3:
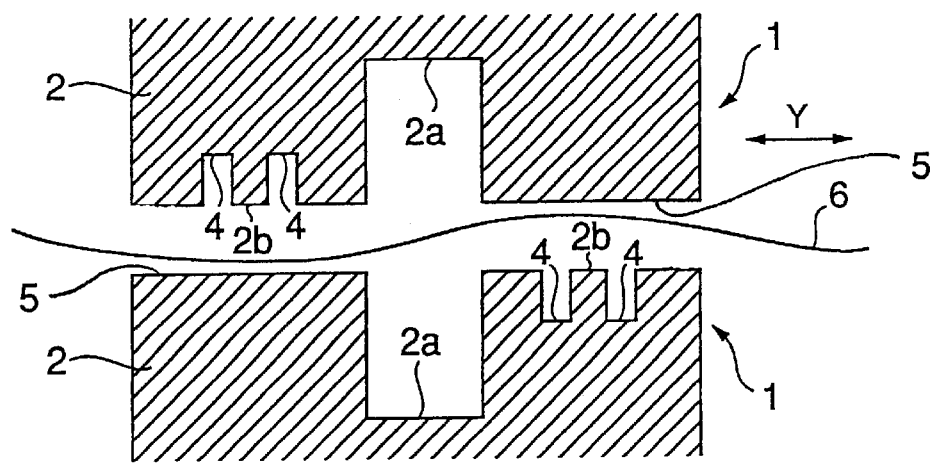
FIG. 3 is a lateral cross-sectional view of a conventional magnetic head as seen from a direction of disk approach thereto.
Figure 4:
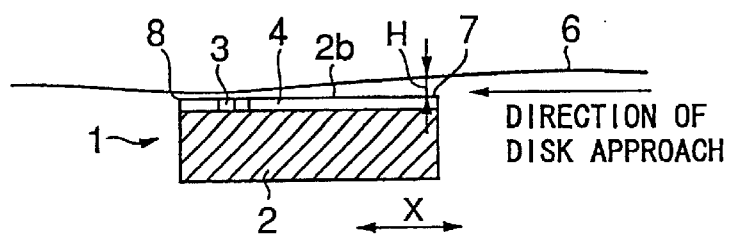
FIG. 4 is a lateral cross-sectional view taken from a radial direction of a disk approaching a conventional magnetic head, for the purpose of illustrating a state of approach of the disk to the magnetic head.
Figure 5:
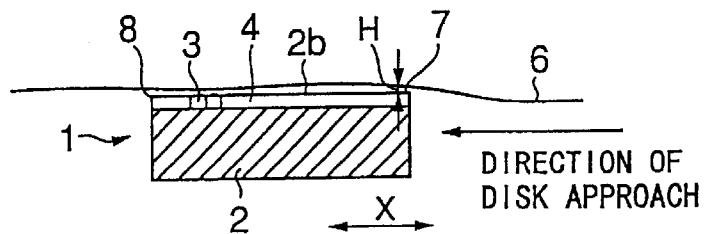
FIG. 5 is a lateral cross-sectional view taken from a radial direction of a disk approaching a conventional magnetic head, for the purpose of illustrating a state in which the disk approaches the magnetic head at a height lower than a standard optimum height position.
Figure 6:
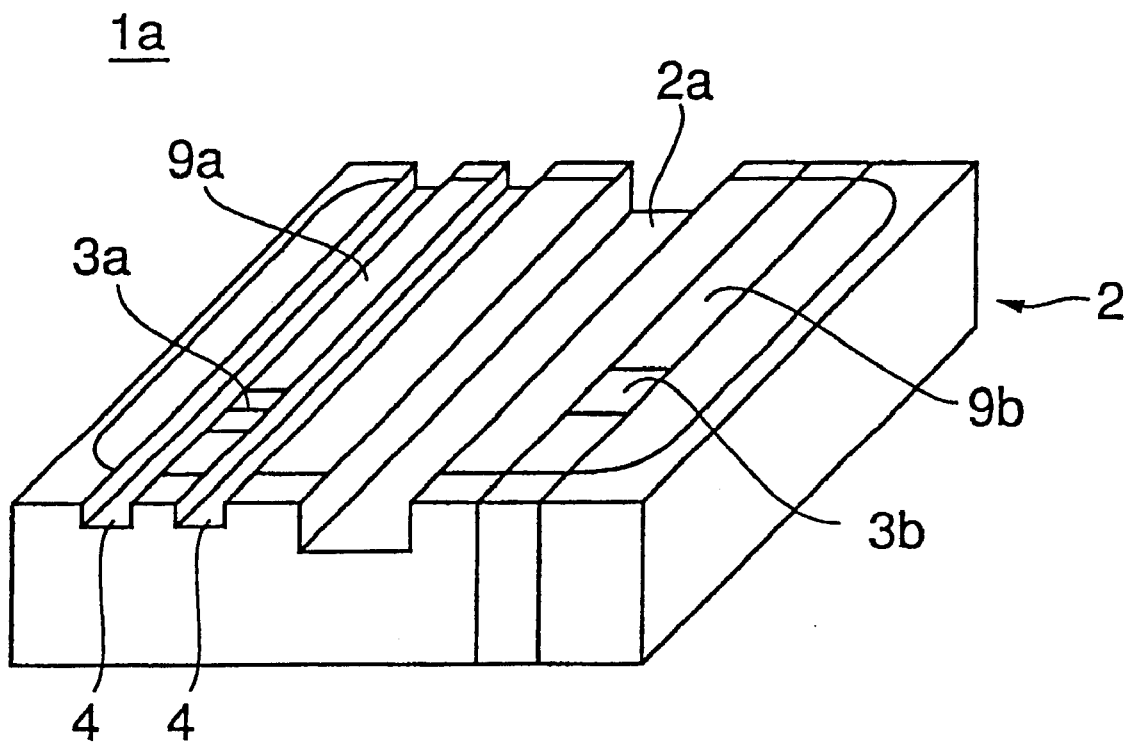
FIG. 6 is an oblique view of a second example of a conventional magnetic head.
Figure 7:
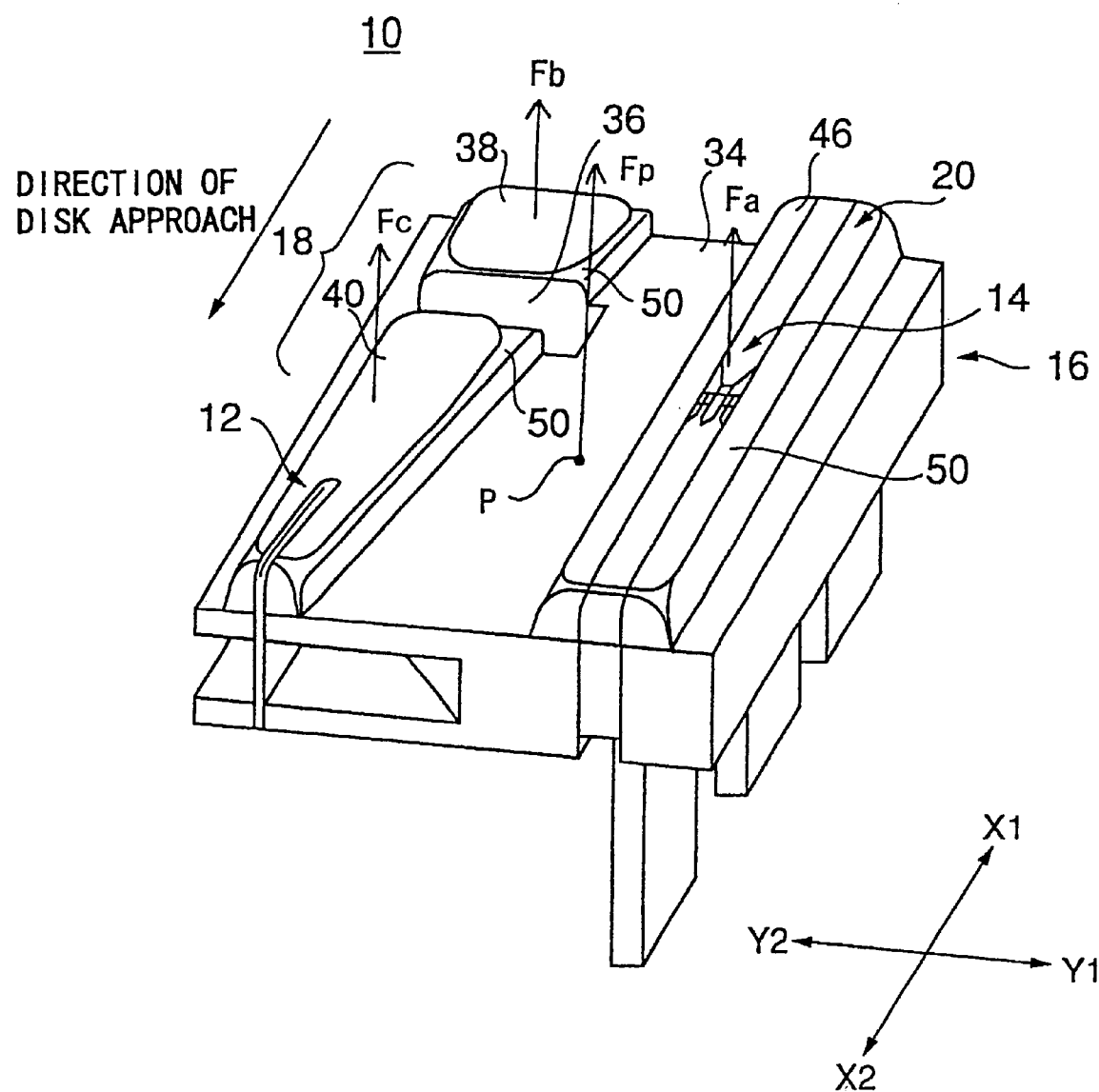
FIG. 7 is an oblique view of a magnetic head according to one embodiment of the present invention.

FIG. 7 is an oblique view of a magnetic head according to one embodiment of the present invention. FIG. 8 is a plan view of the magnetic head shown in FIG. 7.

The magnetic head 10 generally comprises a first magnetic head unit 12, a second magnetic head unit 14 and a slider 16. The first and second magnetic head units 12, 14 are provided on first and second air bearing surfaces 18, 20, respectively, formed on a top surface of the slider 16.

Figure 13:
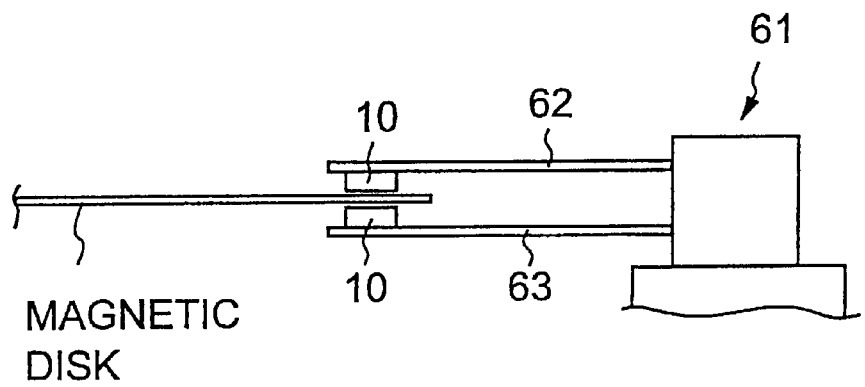
FIG. 13 is a schematic diagram of a magnetic head assembly adapting the magnetic head according to an embodiment of the present invention.
Figure 14:
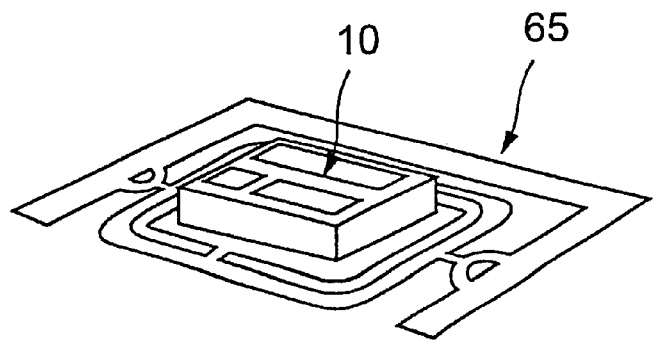
FIG. 14 shows a state in which a magnetic head is attached to a gimbal plate.

The magnetic head 10 is provided on a magnetic head carrier 61 as shown for example in FIG. 13. The magnetic head carrier 61 has a pair of upper and lower arms 62, 63, with a gimbal plate 65 provided at tip portions of the arms 62, 63 as shown in FIG. 14. The magnetic head 10 is positioned on the gimbal plate 65 and is thus displaceable in any direction. During magnetic recording and reproduction, the magnetic disk is inserted between the arms 62, 63 so that the magnetic heads disposed on the arms sandwich the magnetic disk.

Of the pair of magnetic head units 12, 14, the first magnetic head unit 12 is a high-capacity magnetic head for magnetic recording and reproduction of information, and is adapted for magnetic disks, or recording media, having a coercive force of 1500 Oe or more. The first magnetic head unit 12 forms a read/write gap, hereinafter a R/W gap 24, by sandwiching a gap member between magnetic head cores 22a, 22a.

The second magnetic head unit 14 is a magnetic head for ordinary magnetic recording and reproduction of information, and is adapted, for example, for magnetic disks having a coercive force of approximately 600–700 Oe. The second magnetic head unit 14 forms a R/W gap 28 and an erase gap, hereinafter an E gap 32, by sandwiching gap members between magnetic head cores 26a, 26a, 30a, 30a.

In other words, the magnetic head 10 according to the present embodiment has a so-called compatible-type magnetic head structure, capable of performing both ordinary magnetic recording and reproduction of information as well as high-capacity magnetic recording and reproduction of information.

The slider 16 is a block member formed, for example, of a ceramic. The slider 16 supports the first and second magnetic head units 12, 14 and also provides a force for elevating the first and second magnetic head units 12, 14 so that the first and second magnetic head units 12, 14 float over a magnetic disk. Additionally, the slider 16 is provided with a central groove 34, a first air bearing surface 18 divided into first and second surface areas 38 and 40 by a lateral incision 36, and a second air bearing surface 20.

The central groove 34 is formed at a position in a center of the width of the top surface of the slider 16, that is, in a direction indicated by arrows Y1–Y2 in the drawings, so as to extend longitudinally in a direction of travel of the magnetic disk, that is, in a direction indicated by the arrows X1–X2 in the drawings. By forming the central groove 34, the first and second air bearing surfaces 18 and 20, respectively, are formed so as to sandwich the central groove of the slider 16. As shown in the drawings of this embodiment, the widths of the first and second air bearing surfaces 18, 20, in a direction perpendicular to the direction of travel of the disk, gradually decrease from leading edges A1, B1 toward trailing edges A2, B2.

As can be appreciated, in such a structure a width of the central groove 34 gradually expands from a leading edge thereof toward a trailing edge thereof. As a result, an elevating force sufficient to keep the disk from hitting the slider 16 hard can be maintained at the leading edge of the slider while at the trailing edge of the slider the elevating force decreases, thereby bringing the disk into close proximity to the magnetic head units 12, 14 for optimal magnetic recording and reproduction.

Additionally, the lateral incision that divides the first air bearing surface 18 into first surface area 38 and second surface area 40 has a depth greater than that of the central groove, with one end opening onto and communicating with the central groove 34. The other end of the lateral incision 36 opens onto what is shown in the drawing as a left side surface of the magnetic head 10. It should be noted that the first magnetic head unit 12 is positioned near the trailing edge of the second surface area 40 of the first air bearing surface 18.

A part of the flow of air generated in the space between the magnetic disk and the magnetic head units 12, 14 is vented from the left side of the magnetic head 10 via the lateral incision 36. As a result, the elevating force produced by the flow of air is greater at the leading edge than at the trailing edge of the magnetic head 10, that is, the slider 16, so the disk can be prevented from colliding with the slider 16 at the leading edge while being brought into close proximity to the first magnetic head unit 12 located near the trailing edge for optimal magnetic recording and reproduction. Additionally, the relatively greater depth to which the lateral incision 36 is cut reduces the weight of the magnetic head 10, thereby improving tracking.

In order for the magnetic head 10 to float properly over the magnetic disk, the air flow generated between the slider 16 and the magnetic disk must be smooth. It is for this purpose that the first and second air bearing surfaces 18, 20 are formed as highly flat surfaces having a degree of smoothness, for example, of 0.1 $\mu$m or less. These highly flat surfaces are those portions that are enclosed by the dotted chain lines shown in the drawings.

Figure 9A:
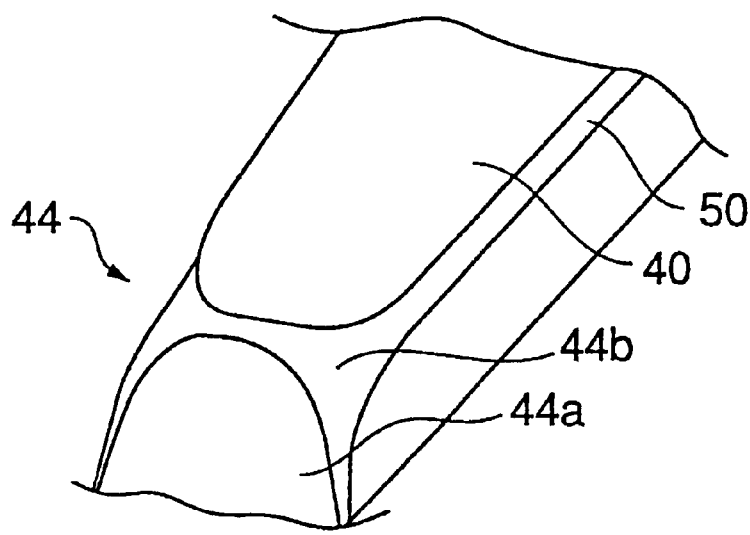
FIGS. 9A, 9B and 9C shown enlarged views of an edge portion of a first air bearing surface of the magnetic head shown in FIG. 7, specifically a schematic oblique view of an edge portion of the first air bearing surface, a schematic plan view of an edge portion of the first air bearing surface and a partial cross-sectional view of an edge portion of the first air bearing surface, respectively.
Figure 9B:
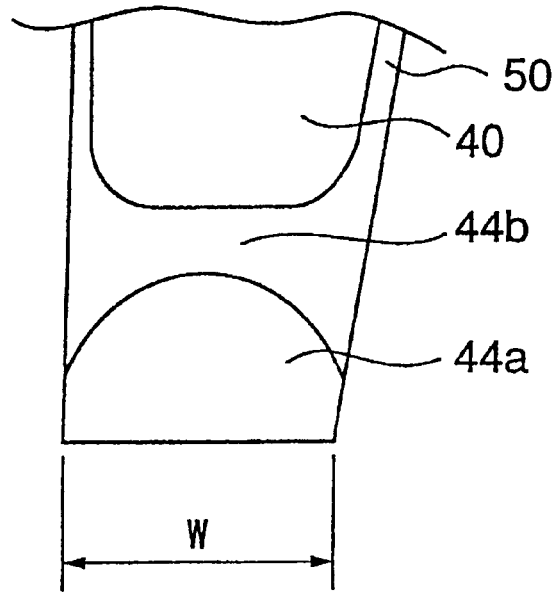
Figure 9C:
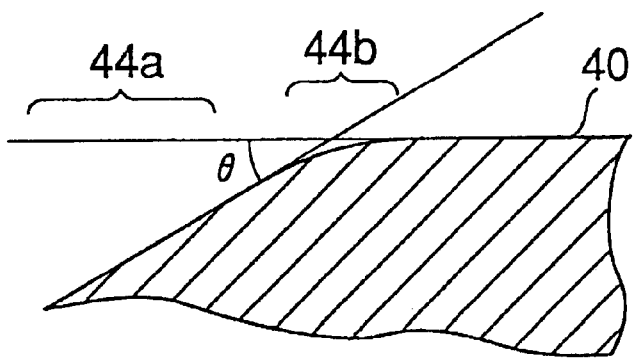

Additionally, first through fourth slanting surfaces 42, 44, 46, 48 are formed on the leading and trailing edges of the first and second air bearing surfaces 18, 20. Each of the first through fourth slanting surfaces 42, 44, 46, 48, as typified by the second slanting surface as shown in FIGS. 9A, 9B and 9C, comprises a flat surface portion 44a and a chamfered portion for the slanted surface 44b. In the first and third slanting surfaces 42, 46 on the leading edges of the first and second air bearing surfaces 18, 20, a width W of the flat surface portion 44a is not less than 0.05 mm and not more than 0.5 mm, and slanted at an angle $\theta$ of not less than 2° and not more than 45°. At the same time, a width W of the flat surface portion of the second and fourth slanting surfaces 44, 48 on the trailing edges of the first and second air bearing surfaces 18, 20 is not less than 0.05 mm and not more than 0.5 mm, and slanted at an angle $\theta$ of not less than 0° and not more than 45°.

By forming the first through fourth slanting surfaces 42, 44, 46, 48 as described above, a hard collision between the disk and the slider 16 can be prevented at the leading edge of the slider 16 and the disk can be brought into appropriate proximity with the first and second magnetic head units 12, 14 at the trailing edge of the slider 16.

A description will now be given of the chamfered portion.

A chamfered portion 50 is formed on a periphery of and so as to enclose the second air bearing surface 20 and the first and second surface areas 38, 40 that together form the first air bearing surface 18. In the present embodiment, a border between the chamfered portion 50 and the first and second air bearing surfaces 18, 20 is curved in the shape of an arc as shown in FIG. 9C so as not to form a hard angled edge.

Additionally, as noted previously, a chamfered portion for the slanting surface is formed on a flat surface area periphery that forms part of the first through fourth slanting surfaces 42, 44, 46, 48 and which corresponds to that area indicated by reference numeral 44b in FIGS. 9A, 9B and 9C with respect to the second slanting surface. The chamfered portion for the slanting surface, like the chamfered portion 50, is also curved in the shape of an arc as shown in FIG. 9C.

By forming the chamfered portion 50 and the chamfered portion for the slanting surface as described above, damage to the disk can be prevented for reasons explained below.

The magnetic disk is a flexible disk, so inevitably vibration rotation occurs when the disk rotates, which produces a change in the flow of air passing between the slider 16 and the magnetic disk. The slider 16, that is, the magnetic head 10, does follow this change in air volume and displace, but when this change is large the slider 16 cannot follow it and hence the magnetic disk may contact the slider 16.

In this case, the position at which the magnetic disk might contact the slider 16 is an outer peripheral position of the first and second air bearing surfaces 18, 20 as well as first through fourth slanting surfaces 42, 44, 46, 48 positioned at the leading edge of the magnetic head toward which the magnetic disk approaches and at the trailing edge of the magnetic head from which the magnetic disk retreats.

Accordingly, by forming a curved chamfered portion on an outer periphery of each of the flat surfaces, even when using a recording medium having a tolerance of a penetration of for example approximately ±0.2 and this recording medium contacts the magnetic head, because the peripheral portion of each of the flat surfaces that comprise the contact positions has a curved chamfered portion, the surface area of the contact with the recording medium becomes large and hence the contact load can be dispersed. Accordingly, even if the recording medium contacts the magnetic head, the load per unit of surface area applied to the recording medium is decreased and thus any damage to the recording medium can be reduced.

Additionally, corner portions on the leading edge side of the periphery of the flat surface forming the first air bearing surface 18 and the periphery of the flat surface forming the second air bearing surface 20 are rounded with a radius of not less then 0.2 mm and not more than 1.0 mm. At the same time, corners of edges of the first surface part 38 and corners of edges of the second surface part 40 disposed opposite each other across the lateral incision 36 are rounded with a radius of not less then 0.2 mm and not more than 1.0 mm.

By rounding the corners as described above, the force of impact upon contact of the disk with the first and second air bearing surfaces 18, 20 can be dispersed and damage to the disk can be avoided.

Figure 12:
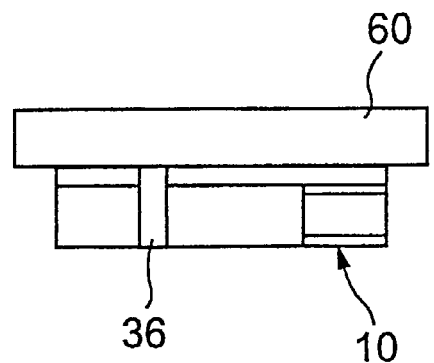
FIG. 12 shows a magnetic head in a state in which an optical flat is disposed atop the magnetic head.

It should be noted that chamfering the periphery of the first and second air bearing surfaces 18, 20 as described above alters the effective area of the flat surfaces that form the air bearing surfaces. As a result, the widths A1, A2, B1, B2 of the first and second air bearing surfaces 18, 20 are equivalent to the distance separating a first interference wave appearing on both sides of the first and second air bearing surfaces 18, 20 in a state in which an optical flat is placed upon the first and second air bearing surfaces 18, 20. Such a state is illustrated in FIG. 12, which is a diagram showing an optical flat 60 disposed atop the magnetic head 10 and across the lateral incision 36. By providing the above-described width, the edges of the air bearing surfaces can be chamfered without interfering with the effect of the invention. By providing the above-described width the edges of the air bearing surfaces can be chamfered without interfering with the effect of the invention.

A description will now be given of the pivot P provided between the first and second magnetic head units 12, 14 at a point of flotation of the magnetic head units 12, 14.

More specifically, the magnetic head 10 elevating force is generated at the second air bearing surface 20 as well as the first surface area 38 and the second surface area 40 of the first air bearing surface 18. If, as shown in FIG. 7, the elevating force generated at the second air bearing surface 20 is $F_a$, the elevating force generated at the first surface area 38 is $F_b$ and the elevating force generated at the second surface area is $F_c$, then the pivot P is the point at which a combined elevating force $F_p$ consisting of elevating forces $F_a$, $F_b$ and $F_c$ acts.

Figure 10:
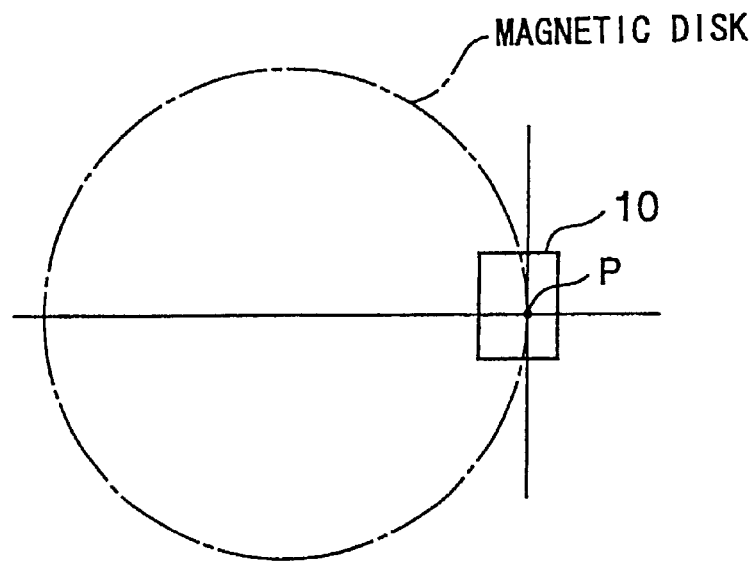
FIG. 10 is a diagram for illustrating the relative positions of the magnetic head and the magnetic disk according to one embodiment of the present invention.

FIG. 10 is a diagram for illustrating the relative positions of the magnetic head 10 and the magnetic disk. As shown in FIG. 10, the pivot P lies at the intersection of a radius of the disk and a hypothetical line extending in the direction of travel of the disk.

By positioning the pivot P as described above, a balanced elevating force can be achieved and the magnetic head 10 can be floated effectively over the surface of the magnetic disk.

Figure 8:
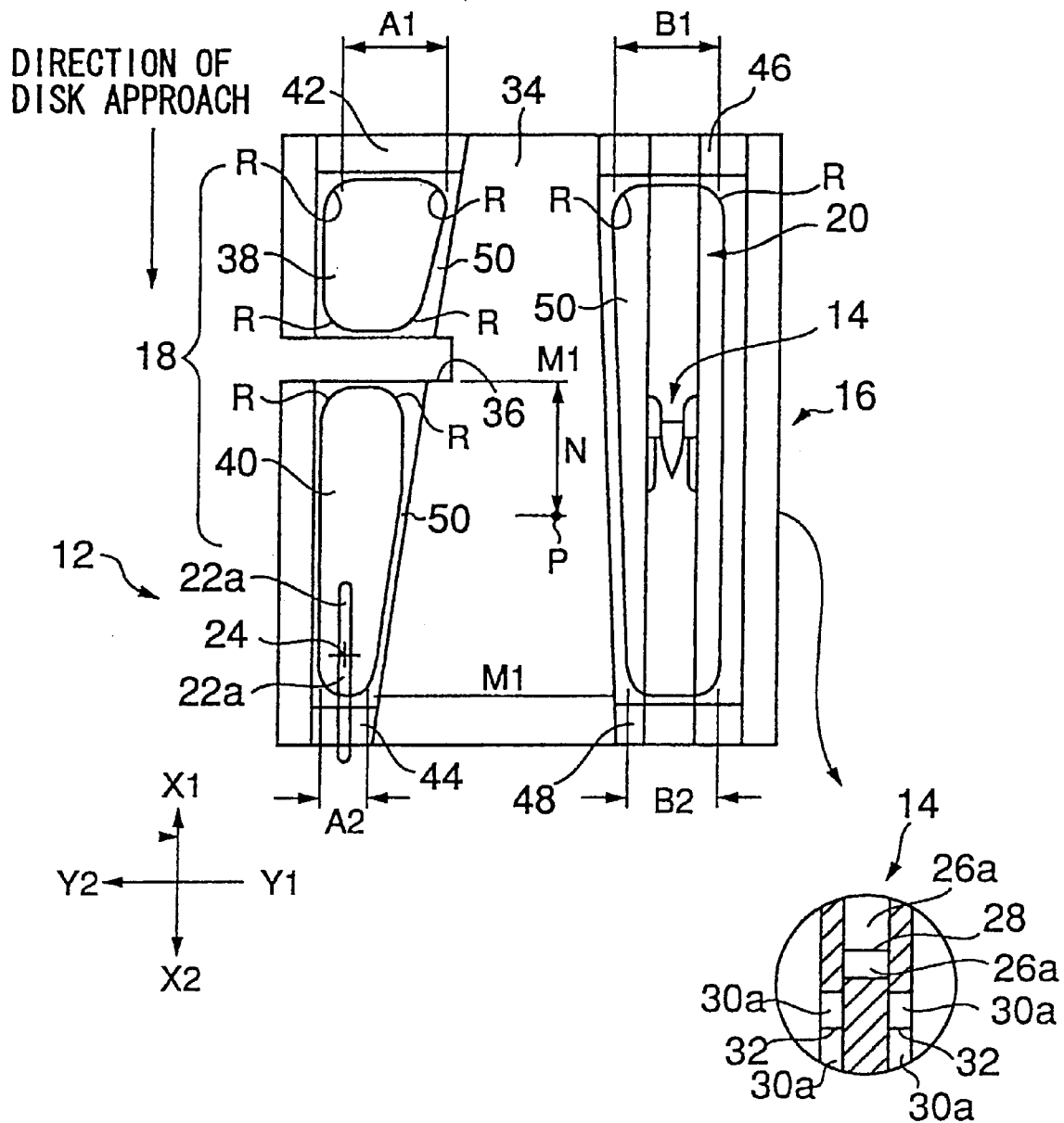
FIG. 8 is a plan view of the magnetic head shown in FIG. 7.

Additionally, a distance N, as shown in FIG. 8, between the pivot P and a hypothetical line M1 extending from a leading edge side and a trailing edge side of the second surface part of the first air bearing surface in a direction perpendicular to the direction of approach of the flexible rotating recording medium is not more than 2 mm.

By positioning the pivot P as described above, the lateral incision 36 lies between the pivot P and the leading edge of the slider 16, so the elevating force is adjusted by the lateral incision 36 and contact between the slider 16 and the magnetic disk can be avoided.

Next, a description will be given of a relation between the second magnetic head unit 14 described above and a third magnetic head unit 52.

Figure 11:
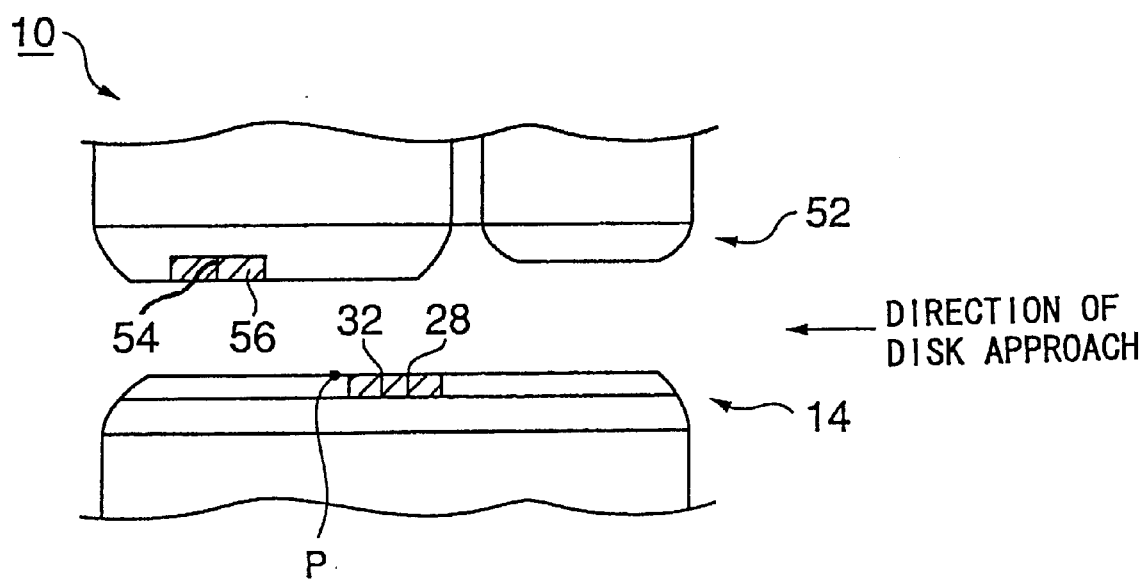
FIG. 11 is a diagram for illustrating the relative positions of the magnetic head units disposed opposite each other.

FIG. 11 is a diagram for illustrating the relative positions of the magnetic head units disposed opposite each other. As shown in the diagram, the R/W gap 28 provided at the second magnetic head unit 14 is positioned closer to the leading edge of the slider 16 than a R/W gap 54 provided on the third magnetic head unit 52. Additionally, an E gap 32 provided on the second magnetic head unit 20 is positioned closer to the leading edge of the slider 16 than a leading edge side of a magnetic core 56 of the third magnetic head unit 52. Accordingly, the weight of the magnetic head 10 is evenly distributed about the pivot P for good balance, improving tracking and thus improving magnetic recording and reproduction of information by the second magnetic head unit 14.

The above description is provided in order to enable any person skilled in the art to make and use the invention and sets forth the best mode contemplated by the inventors of carrying out the invention.

The present invention is not limited to the specifically disclosed embodiments and variations, and modifications may be made without departing from the scope and spirit of the present invention.

The present application patent application Ser. No. 11-061680, filed on Mar. 9, 1999.

What is claimed is:

1. A magnetic head comprising:
   a first magnetic head unit for recording and reproducing information to and from a first flexible rotating recording medium;
   a second magnetic head unit for recording and reproducing information to and from a second flexible rotating recording medium having a coercive force lower than a coercive force of the first flexible rotating recording medium; and a slider supporting the first and second magnetic head units, the slider having a central groove separating a first air bearing surface at which the first magnetic head unit is provided and a second air bearing surface at which the second magnetic head unit is provided, the slider generating an elevating force from an air flow generated in a space between the first and second air bearing surfaces and the flexible rotating recording media, the first air bearing surface having a width on a leading edge side thereof perpendicular to a direction of approach of the flexible rotating recording media and a width on a trailing edge side thereof disposed opposite the leading edge side, the width of the leading edge side being greater than the width of the trailing edge side, the first air bearing surface being divided into a first surface part and a second surface part by a lateral incision extending in a direction perpendicular to the direction of approach of the flexible rotating recording media, a width of the second air bearing surface in a direction perpendicular to the direction of approach of the flexible rotating recording media being either constant or gradually declining from a leading edge side of the second air bearing surface toward a trailing edge side of the second air bearing surface, and the lateral incision having a depth greater than a depth of the central groove.

2. The magnetic head as claimed in claim 1, wherein an edge on the leading edge side and an edge on the trailing edge side of the first and second air bearing surfaces are curved so as to be slanted with respect to the flexible rotating recording media.

3. The magnetic head as claimed in claim 2, wherein:

the angle of slant of the edge on the leading edge side of the first and second air bearing surfaces with respect to the direction of approach of the flexible rotating recording media is not less than 20° and not more than 45°;

and the angle of slant of the edge on the trailing edge side of the first and second air bearing surfaces with respect to the direction of approach of the flexible rotating recording media is not less than 0° and not more than 45°.

4. The magnetic head as claimed in claim 2, wherein a width of the curved portions of the edge on the leading edge side and the edge on the trailing edge side of the first and second air bearing surfaces in a direction perpendicular to the direction of approach of the flexible rotating recording media is not less than 0.05 mm and not more than 0.5 mm.

5. The magnetic head as claimed in claim 1, wherein:

a first interference line of a plurality of interference lines appearing by placing an optical flat on at least one of either the first air bearing surface or the second air bearing surface and measuring the plurality of interference lines rounded with a radius of not less than 0.2 mm and not more than 1.0 mm at corner portions on the leading edge side of at least one of the periphery of the first air bearing surface and the periphery of the second air bearing surface; and the first interference line is rounded with a radius of not less than 0.2 mm and not more than 1.0 mm at corners of edges of the first surface part and corners of edges of the second surface part disposed opposite each other across the lateral incision.

6. The magnetic head as claimed in claim 1, wherein a pivot is provided between the first and second magnetic head units at a point of flotation of the magnetic head units.

7. The magnetic head as claimed in claim 6, wherein a distance between the pivot and a hypothetical line extending from a leading edge side of the second surface part of the first air bearing surface in a direction perpendicular to the direction of approach of the flexible rotating recording media is not more than 2 mm.

8. A magnetic head apparatus comprising:

a first magnetic head unit for recording and reproducing information to and from a first flexible rotating recording medium;

a second magnetic head unit for recording and reproducing information to and from a second flexible rotating recording medium having a coercive force lower than a coercive force of the first flexible rotating recording medium; and a slider supporting the first and second magnetic head units, the slider having a central groove separating a first air bearing surface at which the first magnetic head unit is provided and a second air bearing surface at which the second magnetic head unit is provided, the slider generating an elevating force from an air flow generated in a space between the first and second air bearing surfaces and the flexible rotating recording media;

the first air bearing surface having a width on a leading edge side thereof perpendicular to a direction of approach of the flexible rotating recording media and a width on a trailing edge side thereof disposed opposite the leading edge side, the width of the leading edge side being greater than the width of the trailing edge side;

the first and second magnetic head units being disposed opposite each other;

a read/write gap provided on the second magnetic head unit being positioned closer to a leading edge side of the magnetic head apparatus than a read/write gap provided on the first magnetic head unit; and an eraser gap provided on the second magnetic head unit being positioned closer to the leading edge side of the magnetic head apparatus than a core of the first magnetic head unit;

the first air bearing surface being divided into a first surface part and a second surface part by a lateral incision extending in a direction perpendicular to the direction of approach of the flexible rotating recording media; and the lateral incision having a depth greater than a depth of the central groove.

* * * * *